(12) United States Patent
Cho (10) Patent No.: US 7,298,874 B2
(45) Date of Patent: Nov. 20, 2007

(54) IRIS IMAGE DATA PROCESSING FOR USE WITH IRIS RECOGNITION SYSTEM

(75) Inventor: Seong-Won Cho, Seoul (KR)

(73) Assignee: Senga Advisors, LLC, Boston, MA (US)

( * ) Notice: Subject to any disclaimer, the term of this patent is extended or adjusted under 35 U.S.C. 154(b) by 450 days.

(21) Appl. No.: 10/656,921

(22) Filed: Sep. 5, 2003

(65) Prior Publication Data
US 2004/0114782 A1    Jun. 17, 2004

Related U.S. Application Data

(63) Continuation of application No. PCT/KR01/01302, filed on Jul. 31, 2001.

(30) Foreign Application Priority Data
Mar. 6, 2001    (KR) .............................. 2001-11441

(51) Int. Cl.
*G06K 9/00*    (2006.01)
(52) U.S. Cl. ..................................... 382/118; 382/117
(58) Field of Classification Search ............... 382/118, 382/117
See application file for complete search history.

(56) References Cited

U.S. PATENT DOCUMENTS 4,641,349 A    2/1987  Flom et al.
5,291,560 A *  3/1994  Daugman ................... 382/117
5,572,596 A    11/1996 Wildes et al.

FOREIGN PATENT DOCUMENTS

WO    WO 94/09446    4/1994

\* cited by examiner

*Primary Examiner*—Bhavesh M Mehta
*Assistant Examiner*—Jonathan Schaffer
(74) *Attorney, Agent, or Firm*—Knobbe Martens Olson & Bear LLP (57) ABSTRACT

The present invention relates to an iris recognition method which is one of biometric technologies. According to a non-contact-type human iris recognition method by correction of a rotated iris image of the present invention, the iris image is acquired by image acquisition equipment using an infrared illuminator. Inner and outer boundaries of the iris are detected by analyzing differences in pixels of a Canny edge detector and the image for the inputted iris image, so as to allow the boundaries of the iris to be more accurately detected from the eye image of a user. Thus, the iris image with a variety of deformation can be processed into a correct iris image, so that there is an advantage in that a false acceptance rate and a false rejection rate can be markedly reduce.

38 Claims, 7 Drawing Sheets

IRIS IMAGE DATA PROCESSING FOR USE WITH IRIS RECOGNITION SYSTEM

RELATED APPLICATIONS

This application is a continuing application under 35 U.S.C. § 365 (c) claiming the benefit of the filing date of PCT Application No. PCT/KR01/01302 designating the United States, filed Jul. 31, 2001. The PCT Application was published in English as WO 02/071316 A1 on Sep. 12, 2002, and claims the benefit of the earlier filing date of Korean Patent Application No. 2001/11441, filed Mar. 6, 2001. The contents of the Korean Patent Application No. 2001/11441 and the international application No. PCT/KR01/01302 including the publication WO 02/071316 A1 are incorporated herein by reference in their entirety.

FIELD OF INVENTION

The present invention relates to a non-contact-type human iris recognition method by correction of a rotated iris image. More particularly, the present invention relates to a non-contact-type human iris recognition method by correction of a rotated iris image, wherein the iris image is acquired by image acquisition equipment using an infrared illuminator, wherein inner and outer boundaries of the iris are detected by analyzing differences in pixels of a Canny edge detector and the image for the inputted iris image, so as to allow the boundaries of the iris to be more accurately detected from the eye image of a user, wherein if the iris in the eye image acquired by the image acquisition equipment has been rotated at an arbitrary angle with respect to a centerline of the iris, the rotated iris image is then corrected into a normal iris image, and wherein if a lower portion of a converted iris image in polar coordinates is curved with an irregular shape due to the acquisition of the slanted iris image, the iris image is normalized in predetermined dimensions, so that the iris image with a variety of deformation can be processed into a correct iris image.

BACKGROUND OF INVENTION

An iris recognition system is an apparatus for identifying personal identity by distinguishing one's own peculiar iris pattern. The iris recognition system is superior in its accuracy in terms of the personal identification in comparison to the other biometric methods such as voice or fingerprint, and it has a high degree of security. The iris is a region existing between the pupil and the white sclera of an eye. The iris recognition method is a technique for identifying personal identities based on information obtained by analyzing respective one's own iris patterns different from each other.

Generally, the kernel technique of the iris recognition system is to acquire a more accurate eye image by using image acquisition equipment and to efficiently acquire unique characteristic information on the iris from the inputted eye image.

However, in a non-contact type human iris recognition system which acquires an iris image to be taken at a certain distance therefrom, the iris image with a variety of deformation may be acquired in practical. That is, it is unlikely that a complete eye image can be acquired since the eye is not necessarily directed toward a front face of a camera but positioned at a slight angle with respect to the camera. Thus, there may be a case where the information on an eye image rotated at an arbitrary angle with respect to a centerline of the iris is acquired.

Therefore, in order to solve the above problem produced in the process of image acquisition, it is necessary to accurately detect inner/outer boundaries of the iris from the eye image of a user and to normalize the iris image extracted from the eye image. However, conventional iris recognition methods have a problem in that they cannot accurately detect the inner/outer boundaries of the iris since upon detection of the boundaries, critical values are manually assigned to respective images after defining an arbitrary center of the pupil, or a mean value of the entire image is used as the critical value.

Furthermore, according to the conventional iris recognition system, since the normalization process of the iris image is not made or the correction to the rotated image is not considered, an incomplete eye image can be acquired if the eye is not directed toward the front face of the camera but positioned at a slight angle with respect to the camera, or a rotated iris image can be acquired due to movement of the user such as tilting of his/her head. Consequently, there were many cases where in spite of an iris image of the same user, the iris image may be falsely recognized as that of another user.

SUMMARY OF THE INVENTION

One aspect of the present invention is to provides a method of detecting an outer boundary of an iris from an image of an eye. The method comprises: providing data representing an image of an eye comprising an image of the iris of the eye, the iris image being substantially annular and defined between inner and outer boundaries, the eye image comprising a plurality of pixels, the eye image data comprising location information and image information for each pixel of the eye image; providing location information of the inner boundary of the iris image; comparing the image information of a pixel on the inner boundary with the image information of pixels of the eye image; and determining a pixel is on the outer boundary of the iris image when a difference between the image information of that pixel and the image information of the pixel on the inner boundary becomes a maximum among differences of the image information. In the above-described method, the location information of the inner boundary is obtained with use of a Canny edge detection method.

Another aspect of the present invention provides a method of obtaining an iris pattern. The method comprises: providing an image of an iris of an eye, the iris image being substantially annular and defined between inner and outer boundaries; obtaining data of a substantial portion, but not all, of the iris image; and processing the data of the substantial portion to obtain an iris pattern. In the above-described method, the data comprises positional information and image information of a point within the portion. The substantial portion of the iris image is from about 25% to about 95% of an area of the iris image. The substantial portion of the iris image is from about 40% to about 85% of an area of the iris image. The substantial portion of the iris image is from about 50% to about 75% of an area of the iris image. The substantial portion of the iris image is from about 55% to about 65% of an area of the iris image. The substantial portion of the iris image is substantially annular. The substantial portion is annular and defined from the inner boundary to an imaginary closed line between the inner and outer boundaries. The imaginary closed line is substantially parallel to the inner boundary.

Still in the above-described method, a tangent at a point on the inner boundary is substantially parallel to a tangent at a point on the imaginary line that is on a line perpendicular to the tangent at the point on the inner boundary. The substantial portion is annular and defined from an imaginary closed line between the inner and outer boundaries to the outer boundary. The imaginary closed line is substantially parallel to the outer boundary. The substantial portion is annular and defined between a first imaginary closed line and a second imaginary closed line, wherein the first imaginary line is drawn between the inner and outer boundaries, and wherein the second imaginary line is drawn between the first imaginary line and the outer boundary. The first and second lines are substantially parallel to each other. The substantial portion of the iris image is not annular. The data of the substantial portion is transformed into a polar coordinate form.

A further aspect of the present invention provides a device for use with a iris pattern recognition system. The method comprises: means for providing an image of an iris of an eye, the iris image being substantially annular and defined between inner and outer boundaries; means for obtaining data of a substantial portion, but not all, of the iris image; and means for processing the data of the substantial portion to obtain an iris pattern. In the above-described device, an iris image processing device comprises: an input device configured to receive an image of an eye comprising an image of an iris of an eye, the iris image being substantially annular and defined between inner and outer boundaries; a first circuit configured to identify data of the iris image from the image of the eye; and a second circuit configured to process the iris image data so as to obtain data of a substantial portion, but not all, of the iris image for further processing. The first and second circuits are integrated in a circuit board or a chip.

The other aspect of the present invention is a security system using iris pattern recognition. The system comprises: an input device configured to receive an image of an eye comprising an image of an iris of an eye, the iris image being substantially annular and defined between inner and outer boundaries; a first circuit configured to identify data of the iris image from the image of the eye; a second circuit configured to process the iris image data so as to obtain data of a substantial portion, but not all, of the iris image for further processing; and a third circuit configured to process the data of the substantial portion of the iris image so as to determine whether the data of the iris image matches a pre-registered data.

A further aspect of the present invention is a method of processing a iris image. The method comprises: providing data of an original image of an iris; and producing at least one modified iris image data with use of the data of the original iris image, the modified iris image data representing an iris image that is rotated by an angle about a point on the original image. In the above-described method the point of rotation is located at a substantially central position of the original image of the iris. The original iris image data to determine whether the original iris image data matches a pre-registered iris image data. The modified iris image data to determine whether the modified iris image data matches a pre-registered iris image data. The modified iris image data represents an iris image that is rotated in a clockwise direction. The modified iris image data represents an iris image that is rotated in a counter-clockwise direction. A plurality of modified iris image data are produced. The modified iris image data is processed in accordance with a wavelet transform method. The original iris image data is processed in accordance with a wavelet transform method.

Still another aspect of the present invention provides an iris image processing device, which comprises: means for providing data of an original image of an iris; and means for producing at least one modified iris image data based on the data of the original iris image, the modified iris image data representing an iris image that is rotated by an angle about a point on the original image. The above-described device further comprises: means for determining whether the modified iris image data matches a pre-registered data.

Still another aspect of the present invention provides an iris image processing device, which comprises: an input device configured to receive an image of an eye comprising an image of an iris of an eye; a first circuit configured to identify data of the iris image from the image of the eye; and a second circuit configured to process the iris image data so as to produce at least one modified iris image data based on the data of the original iris image, the modified iris image data representing an iris image that is rotated by an angle about a point on the original image.

Still further aspect of the present invention provides a security system using iris pattern recognition, which comprises: the above-described iris image processing device; and a third circuit configured to process the modified iris image data to determine whether the modified iris image data matches a pre-registered data.

The present invention is conceived to solve the above problems. An object of the present invention is to provide a non-contact type human iris recognition method for performing a pre-processing by detecting an iris image from an eye image of a user acquired by image acquisition equipment and converting the iris image into an iris image in polar coordinates, wherein inner and outer boundaries of an iris of the user are detected by analyzing differences in pixels of a Canny edge detector and the image.

Another object of the present invention is to provide a human iris recognition method, wherein if an iris in an acquired eye image has been rotated at an arbitrary angle with respect to a centerline of the iris, i.e. in case of a rotated iris image, the rotated iris image is corrected into a normal iris image, and wherein if a lower portion of a converted iris image in the polar coordinates is curved with an irregular shape, i.e. in case of a slanted iris image, the iris image is normalized in predetermined dimensions, so that the iris image with a variety of deformation is processed into data on a correct iris image so as to markedly reduce a false acceptance rate and a false rejection rate.

In order to achieve the objects of the present invention, the present invention provides a non-contact type human iris recognition method by correction of a rotated iris image for performing a pre-processing by acquiring an eye image of a user by means of image acquisition equipment using an infrared illuminator, by extracting an iris image from the acquired user's eye image, and by converting the extracted iris image into an iris image in polar coordinates. The pre-processing comprises the steps of detecting an inner boundary of an iris from the acquired user's eye image by means of a Canny edge detector; comparing a pixel value of image information at a beginning coordinates (x, y) of the detected inner boundary of the iris with the other pixel values of image information while proceeding upward and downward and leftward and rightward from the inner boundary, finding out the maximum value among values of difference in the compared pixels, and detecting an outer boundary of the iris; and extracting an iris region existing between the inner and outer boundaries, and converting the extracted iris region into the iris image in the polar coordinates.

If the iris in the acquired eye image has been slanted, the method may further comprise a step of normalizing the converted iris image in the polar coordinates so as to have predetermined dimensions.

If the iris in the acquired eye image has been rotated at an arbitrary angle with respect to a centerline of the iris, the method may further comprise the steps of temporarily generating a plurality of arrays of the iris image by means of shifts by an arbitrary angle with respect to an array of the converted iris image in the polar coordinates; performing wavelet transform in order to generate characteristic vectors of the iris corresponding to the plurality of arrays of the iris image that have been temporarily generated; comparing the respective characteristic vectors generated by the wavelet transform with previously registered characteristic vectors to obtain similarities; and accepting a characteristic vector corresponding to the maximum similarity among the obtained similarities as the characteristic vector of the user.

BRIEF DESCRIPTION OF THE DRAWINGS

FIGS. 4(a) and (b) show a rotated iris image resulting from the tilting of the user's head.

FIGS. 5(a) and (b) show procedures of a correction process of the rotated iris image shown in FIGS. 4(a) and (b).

DETAILED DESCRIPTION FOR PREFERRED EMBODIMENT

Hereinafter, a non-contact type human iris recognition method by correction of a rotated iris image according to the present invention will be described in detail with reference to the accompanying drawings and, in particular, to FIG. 1.

Figure 1:
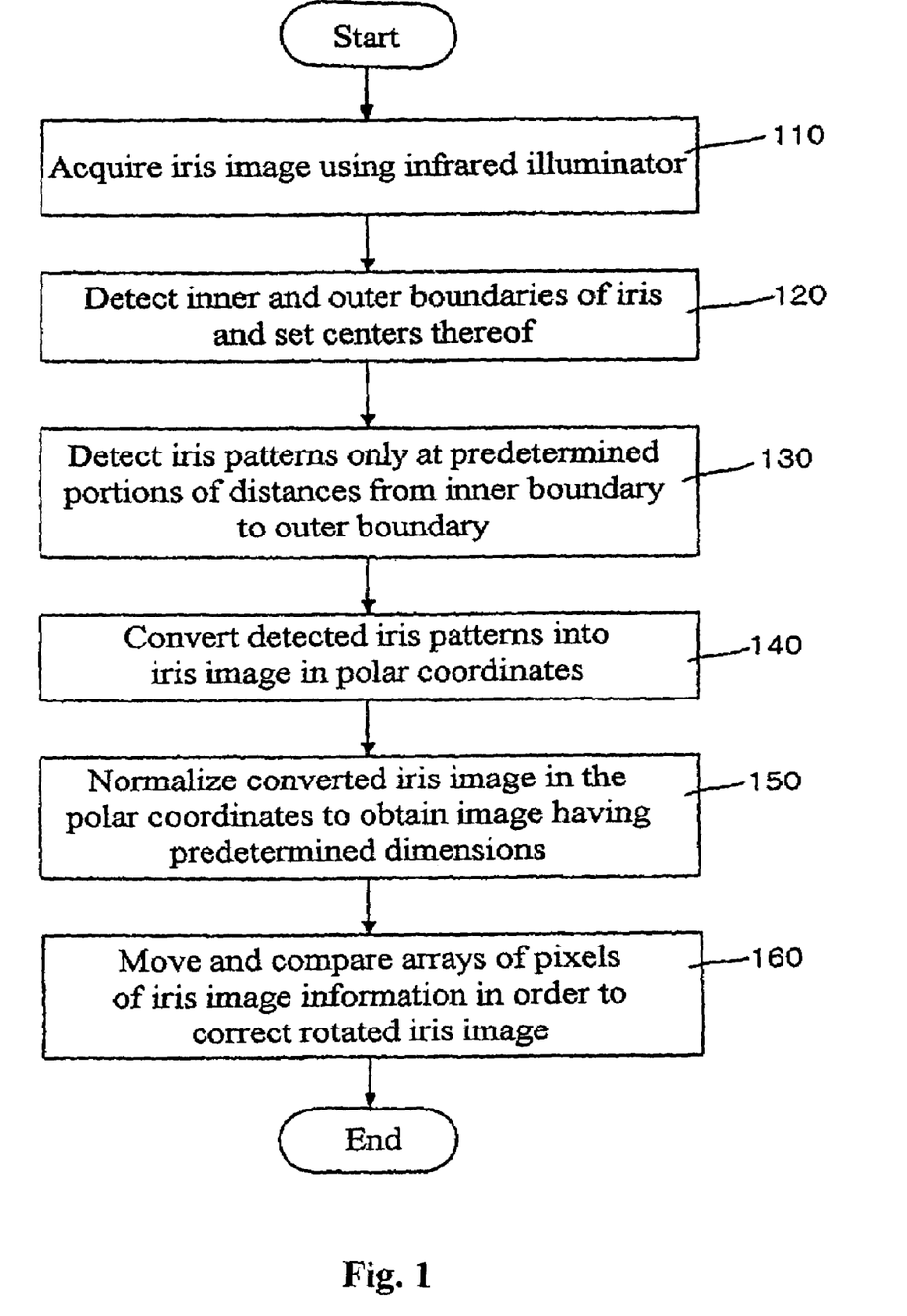
FIG. 1 is a flowchart explaining the procedures of a normalization process of an iris image according to the present invention.

FIG. 1 is a flowchart explaining procedures of a normalization process of an iris image according to the present invention. Referring to FIG. 1, at step 110, an eye image is acquired by image acquisition equipment using an infrared illuminator and a visible light rejection filter. At this time, a reflective light is caused to be gathered in the pupil of an eye so that information on the iris image is not lost. At step 120, inner and outer boundaries of the iris are detected in order to extract only an iris region from the acquired eye image, and the center of the detected inner and outer boundaries is set. Step 120 is performed by a method for detecting the inner and outer boundaries of the iris using differences in pixels of a Canny edge detector and the image according to the present invention, which will be specifically explained below.

Figure 2A:
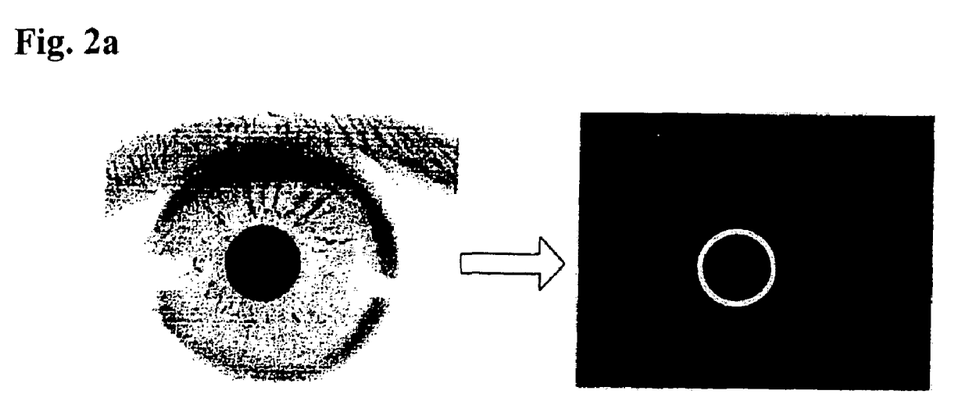
FIG. 2a is a view showing a result of detection of a pupillary boundary using a Canny edge detector.

FIG. 2a is a view showing a result of detection of a pupillary boundary, i.e. the inner boundary of the iris, using the Canny edge detector. Referring to FIG. 2a, it is noted that only the pupillary boundary is detected by employing the Canny edge detector. That is, as shown in FIG. 2a, the inner boundary of the iris is detected by using the Canny edge detector that is a kind of boundary detecting filter. The Canny edge detector smoothes an acquired image by using Gaussian filtering and then detects a boundary by using a Sobel operator. The Gaussian filtering process can be expressed as the following Equation 1, and the used Sobel operator can be expressed as the following Equation 2.

[Equation 1]

$$I_G(x, y) = G(x, y) \times I(x, y) \quad \text{[Equation 1]}$$

$$S_x = I[i-1][j+1] + 2I[i][j+1] + I[i+1][j+1] - \quad \text{[Equation 2]}$$
$$I[i-1][j-1] - 2I[i][j-1] - I[i+1][j-1]$$
$$S_y = I[i+1][j+1] + 2I[i+1][j] + I[i+1][j-1] -$$
$$I[i-1][j+1] - 2I[i-1][j] - I[i-1][j-1]$$

Figure 2B:
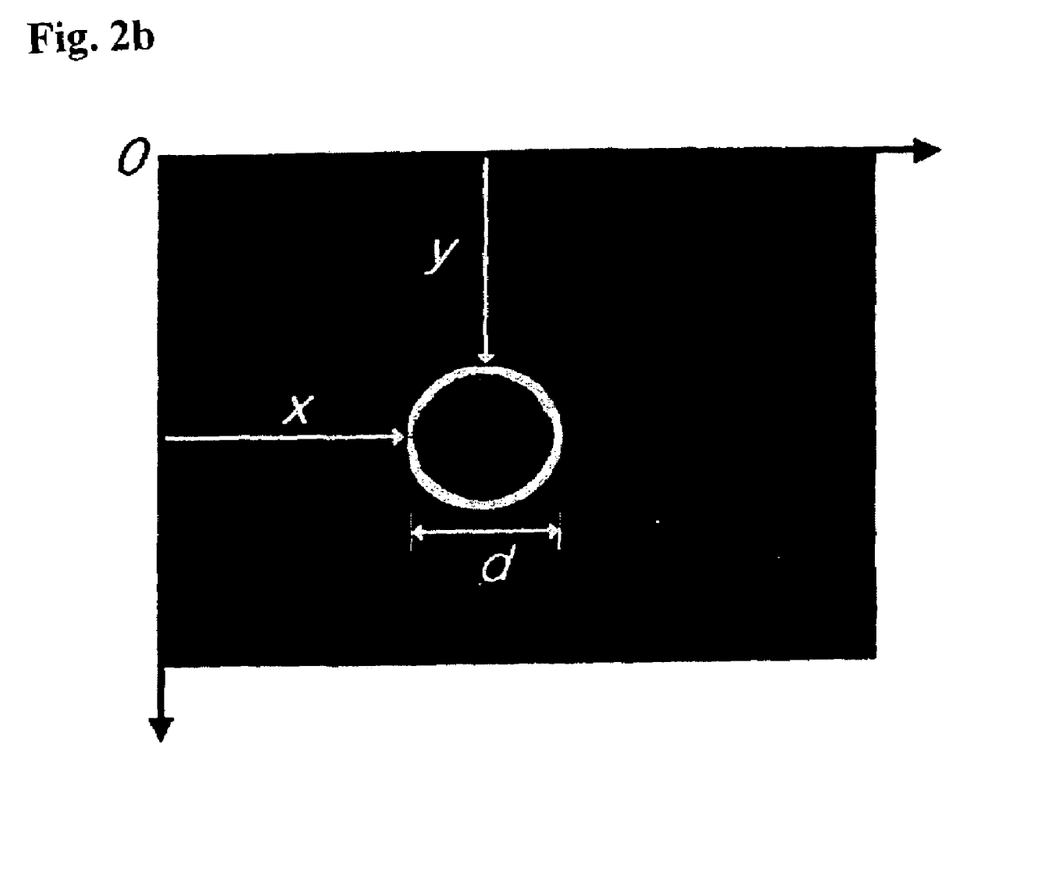
FIG. 2b is a view showing center coordinates and diameter of a pupil.

In a case where the boundary detecting method employing the Canny edge detector is used, even though a normal eye image is not acquired since the eye of a user is not directed toward a front face of a camera but positioned at a slight angle with respect to the camera, the inner boundary of the iris, i.e. papillary boundary, can be correctly detected and center coordinates and radius of the pupil can also be easily obtained. FIG. 2b shows the center coordinates and diameter of the pupil. Referring to FIG. 2b, the pupil's radius is d/2, and the pupil's center coordinates are (x+d/2, y+d/2).

On the other hand, the outer boundary of the iris in the image can be detected by comparing pixel values while proceeding upward and downward and leftward and rightward from the pupillary boundary, i.e. the inner boundary of the iris, and by finding out maximum values of differences in the pixel values. The detected maximum values are Max{I(x, y)−I(x−1, y)}, Max{I(x, y)−I(x+1, y)}, Max{I(x, y)−I(x, y−1)}, and Max{I(x, y)−I(x, y+1)}, where I(x, y) is a pixel value of the image at a point of (x, y). The reason why the differences in the pixel values are obtained while proceeding upward and downward and leftward and rightward from the inner boundary of the iris upon detection of the outer boundary of the iris in the image is to make the inner and outer centers different from each other. That is, in a case where a slanted iris image is acquired, since the pupil is located a little upward, downward, leftward or rightward of the image, the inner and outer centers should be set differently from each other.

Figure 2C:
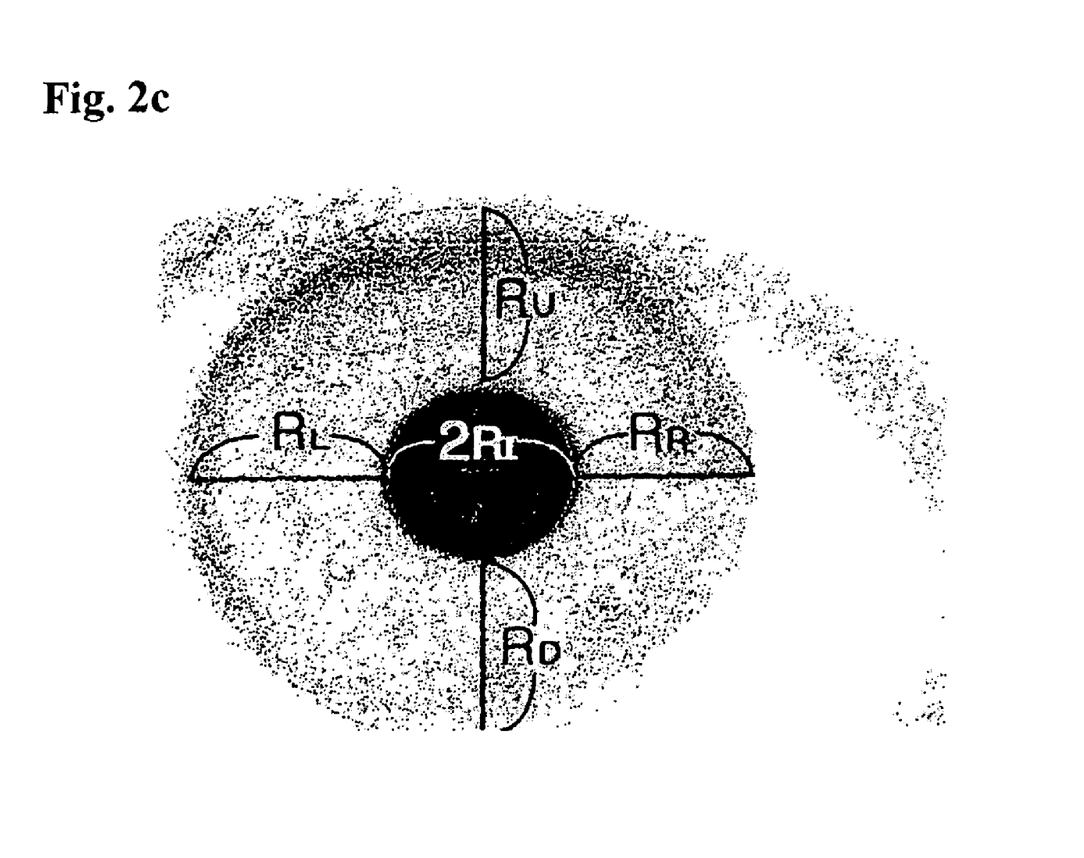
FIG. 2c shows an iris image upon obtainment of a radius and center of an outer boundary of an iris according to the present invention.

FIG. 2c shows an iris image upon obtainment of the radius and center of the outer boundary of the iris according to the present invention. In a case where an incomplete eye image is acquired since the eye is not directed toward the front face of the camera but positioned at a slight angle with respect to the camera, a process of setting the centers of the inner/outer boundaries of the iris is required. First, values of distances $R_L$, $R_R$, $R_U$ and $R_D$ from the inner boundary to the left, right, upper and lower portions of the outer boundary, respectively, and a value of the radius RI of the inner boundary, i.e. pupillary boundary, are calculated. Then, the center of the outer boundary is obtained by finding out bisection points upward and downward and leftward and rightward of the image using the above calculated values.

At step 130, iris patterns are detected only at predetermined portions of the distances from the inner boundary to the outer boundary. At step 140, the detected iris pattern is converted into an iris image in the polar coordinates. At step 150, the converted iris image in the polar coordinates is normalized to obtain an image having predetermined dimensions in its width and height.

The conversion of the extracted iris patterns into the iris image in the polar coordinates can be expressed as the following Equation 3.

[Equation 3]

$$I(x(r, \theta), y(r, \theta)) \Rightarrow I(r, \theta) \quad \text{[Equation 3]}$$

where θ is increased by 0.8 degrees, and r is calculated by using the second Cosine Rule from a distance between the outer center $C_O$ and the inner center $C_I$ of the iris, the radius $R_O$ of the outer boundary, and the value of θ. The iris patterns between the inner and outer boundaries of the iris are extracted using the r and θ. In order to avoid changes in features of the iris according to variations in the size of the pupil, when the iris image between the inner and outer boundaries of the iris is divided into 60 segments and the θ is varied by 0.8 degrees to represent 450 data, the iris image is finally normalized into a 27000 segmented iris image (θ×r=450×60).

Figure 3:
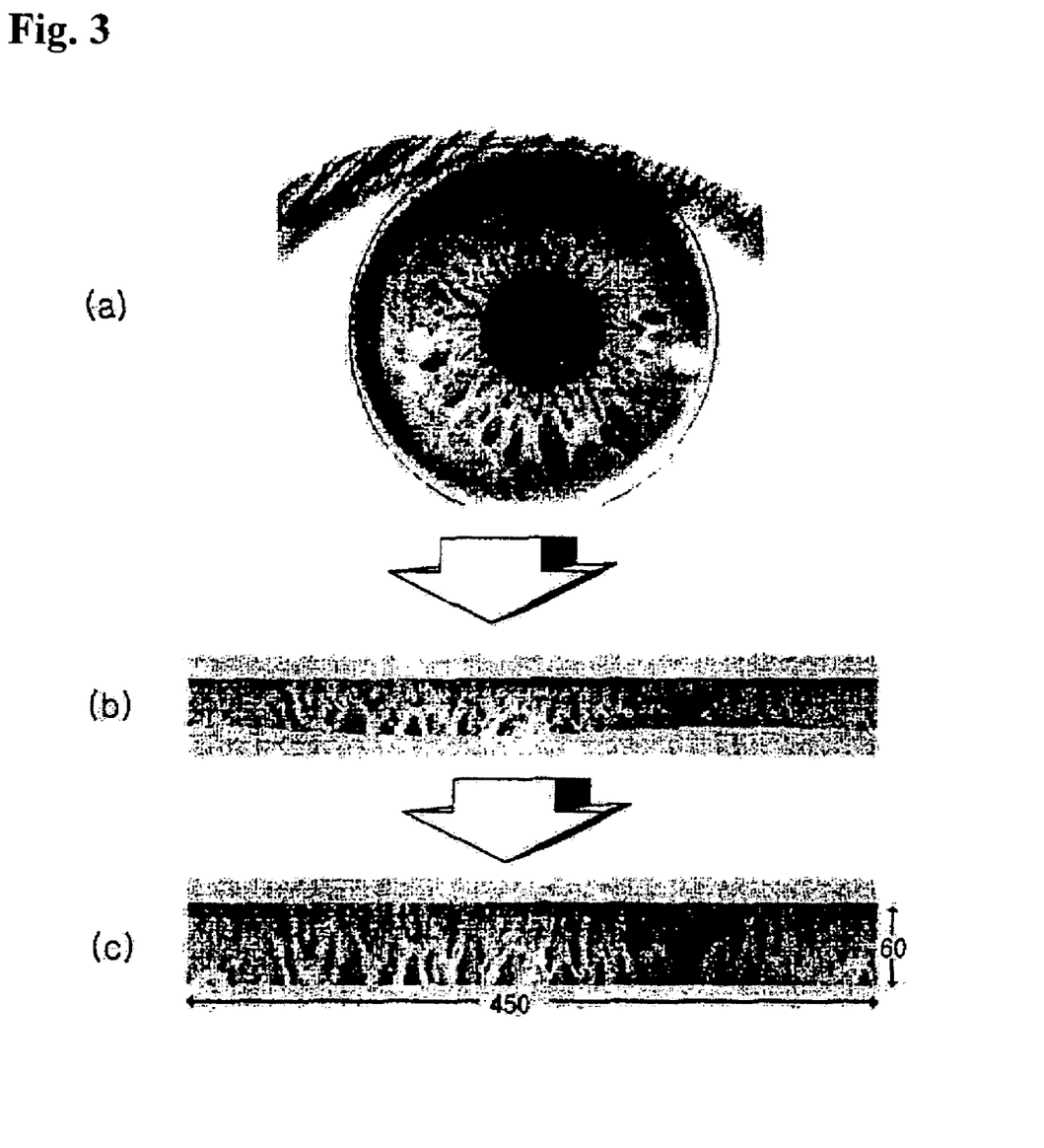
FIGS. 3(a) to (c) show the procedures of the normalization process of a slanted iris image.

FIG. 3(a) shows the slanted iris image, and FIG. 3(b) is the iris image in polar coordinates converted from the slanted iris image. It can be seen from FIG. 3 (b) that a lower portion of the converted iris image in the polar coordinates is curved with an irregular shape. In addition, FIG. 3(c) shows an iris image having the dimensions of M pixels in width and N pixels in height, which is normalized from the irregular image of the iris patterns. Hereinafter, the normalization process of the slanted iris image will be described with reference to FIGS. 3(a) to (c). In the portion corresponding to the distance between the inner and outer boundaries of the iris in FIG. 3(a), the iris patterns existing at only a portion corresponding to X % of the distance between the inner and outer boundaries of the iris are taken in order to eliminate interference from the illuminator and acquire a large amount of iris patterns. That is, when the inner and outer boundaries of the iris are detected, the iris patterns are taken and then converted into those in the polar coordinates. However, in a case where reflective light from the illuminator is gathered on the iris, iris patterns existing at only a portion corresponding to 60% of the distance from the inner boundary among the region from the inner boundary (pupillary boundary) of the iris to the outer boundary can be picked up and converted into those in the polar coordinates. The value of 60% selected in this embodiment of the present invention was experimentally determined as a range in which a greatest deal of iris patterns can be picked up while excluding the reflective light gathered on the iris.

In FIG. 3(b), the slanted iris image is converted into the iris image in the polar coordinates. As shown in FIG. 3(b), when the iris patterns are converted into those in the polar coordinates, the lower portion of the converted iris pattern image in the polar coordinates is curved with an irregular shape. Thus, it is necessary to normalize the irregular iris pattern image. In FIG. 3(c), the irregular image of the iris patterns is normalized to obtain the iris image with the dimensions of M pixels in width and N pixels in height.

For reference, the performance of the iris recognition system is evaluated by two factors: a false acceptance rate (FAR) and a false rejection rate (FRR). The FAR means the probability that the iris recognition system incorrectly identifies an impostor as an enrollee and thus allows entrance of the impostor, and the FRR means the probability that the iris recognition system incorrectly identifies the enrollee as an impostor and thus rejects entrance to the enrollee. According to the present invention, when a pre-processing is made by employing the method for detecting the boundaries of the iris and the normalization of the slanted iris image, the FAR was reduced from 5.5% to 2.83% and the FRR is reduced from 5.0% to 2.0% as compared with the iris recognition system employing a conventional method for detecting the boundaries of the iris.

Finally, at step 160, if the iris in the acquired eye image has been rotated at an arbitrary angle with respect to a centerline of the iris, the arrays of pixels of the iris image information are moved and compared in order to correct the rotated iris image.

Figure 4:
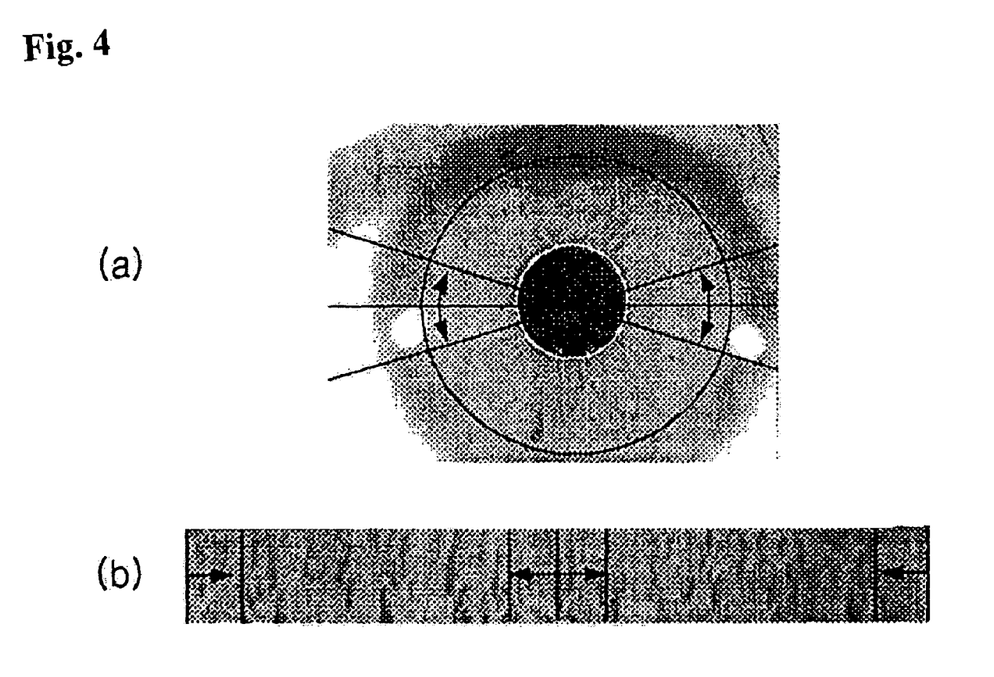

FIGS. 4 (a) to (b) show a rotated iris image resulting from the tilting of the user's head. Upon acquisition of an iris image, the user's head may be tilted a little toward the left or right, under which if the iris image is acquired, the rotated iris image is obtained as shown in FIG. 4(a). That is, if the eye image acquired at step 110 has been rotated at an arbitrary angle with respect to a centerline of the eye, a process of correcting the rotated image is required. FIG. 4(a) shows the iris image rotated by about 15 degrees in a clockwise or counterclockwise direction with respect to the centerline of the eye. When the rotated iris image is converted into an image in the polar coordinates, the iris patterns in the converted image are shifted leftward or rightward as shown in FIG. 4(b), as compared with the normal iris pattern.

Figure 5:
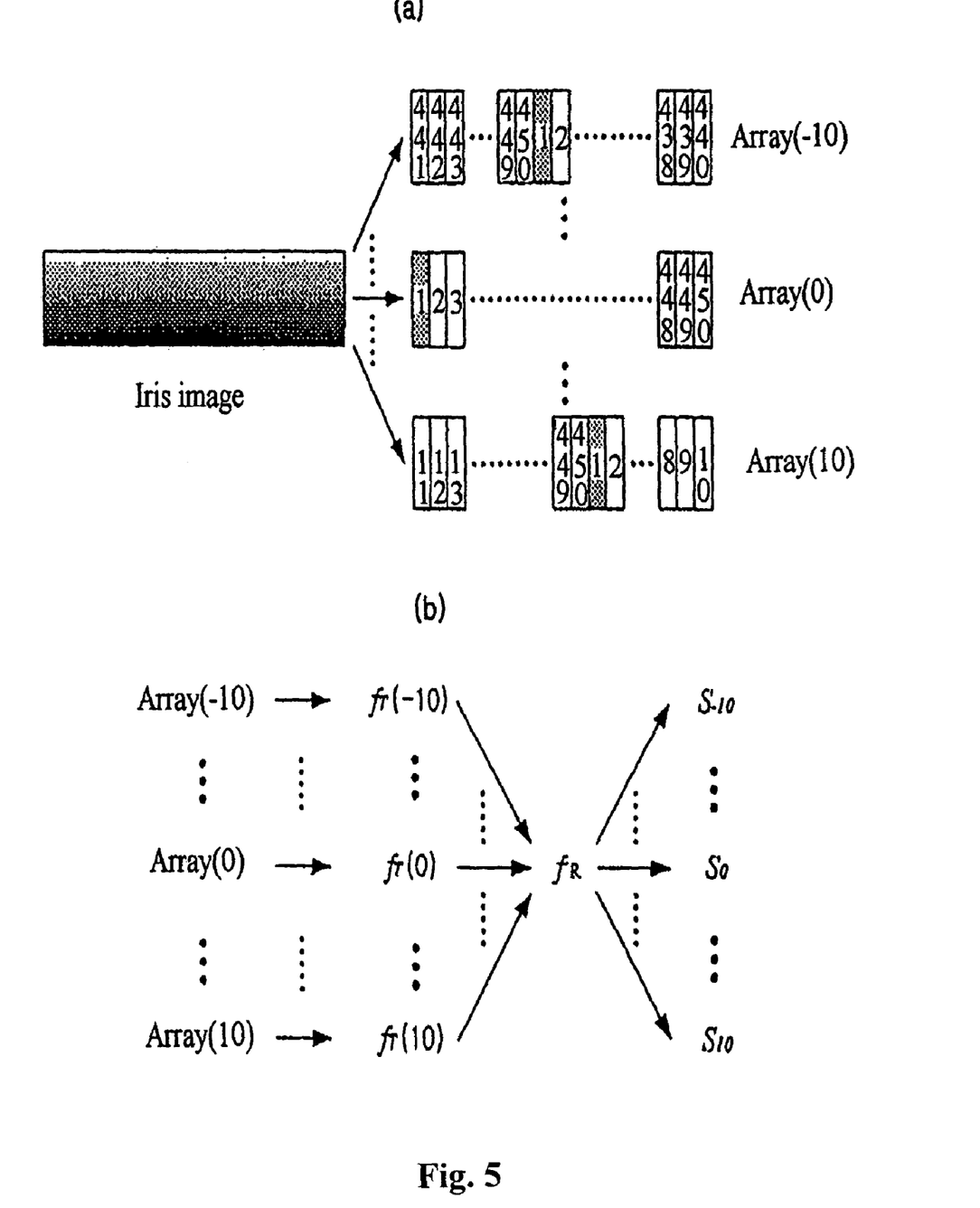

FIGS. 5(a) and (b) show procedures of the process of correcting the rotated iris image shown in FIGS. 4(a) and (b). The process of correcting the rotated iris image, which has resulted from the tilting of the user's head, by comparing and moving the arrays of the iris image information will be described below with reference to FIGS. 5(a) and (b).

Referring to FIG. 5(a), from the rotated iris image resulting from the tiling of the user's head, a plurality of arrays Array(n) of the iris image are temporarily generated by means of shifts by an arbitrary angle with respect to an Array(0) of the converted iris image in the polar coordinates. That is, by shifting columns leftward or rightward of the Array(0) based on the Array(0) of the converted iris image in the polar coordinates, 20 arrays of image information from Array(0) to Array(−10) and from Array(0) to Array( 10) are temporarily generated.

In order to generate characteristic vectors of the iris corresponding to the plurality of arrays of iris image that have been temporarily generated, wavelet transform is performed. The respective characteristic vectors generated by the wavelet transform are compared with previously registered characteristic vectors to obtain similarities. A characteristic vector corresponding to the maximum similarity among the obtained similarities is accepted as the characteristic vector of the user.

In other words, by generating the arrays Array(n) of image information on the rotated image as mentioned above and performing the wavelet transform for the respective arrays of the image information as shown FIG. 5(b), the characteristic vectors $f_T(n)$ of the iris corresponding to the temporarily generated plurality of arrays Array(n) of the iris image are then generated. The characteristic vectors $f_T(n)$ are generated from $f_T(0)$ to $f_T( 10)$ and from $f_T(0)$ to $f_T(-10)$. The respective generated characteristic vectors $f_T(n)$ are compared with each of the characteristic vectors $f_R$ of the enrollees and thus similarities $S_n$ are obtained. A characteristic vector $f_T(n)$ corresponding to the maximum similarity among the obtained similarities $S_n$ is considered as a resulted value in which the rotation effect is corrected, and is accepted as the characteristic vector of the user's iris.

As described above, according to the non-contact type human iris recognition method by the correction of the rotated iris image of the present invention, there is an advantage in that by detecting the inner and outer boundaries of the iris using the differences in pixels of the Canny edge detector and the image, the boundaries of the iris can be more correctly detected from the eye image of the user.

Furthermore, according to the non-contact type human iris recognition method of the present invention, if the iris in the eye image acquired by the image acquisition equipment has been rotated at an arbitrary angle with respect to the centerline of the iris, the rotated iris image is corrected into the normal iris image. Otherwise, if a lower portion of the converted iris image in the polar coordinates is curved and thus has an irregular shape due to the acquisition of the slanted iris image, the iris image is normalized in predetermined dimensions. Thus, there is another advantage in that the iris image with a variety of deformation is processed into data on a correct iris image so as to markedly reduce a false acceptance rate and a false rejection rate.

It should be noted that the above description merely exemplifies embodiments of the non-contact type human iris recognition method by the correction of the rotated iris image according to the present invention, and thus, the present invention is not limited to the above embodiments. A person skilled in the art can make various modifications and changes to the present invention without departing from the technical spirit and scope of the present invention defined by the appended claims.

What is claimed is:

1. A method of processing an image of an eye, the method comprising:
   providing data representing an image of an eye comprising an image of an iris of the eye, the iris image being defined between inner and outer boundaries, the eye image comprising a plurality of pixels, the eye image data comprising location information and image information for each pixel of the eye image;
   providing location information of the inner boundary of the iris image, wherein a first inner boundary pixel and a second inner boundary pixel are located at different points on the inner boundary;
   finding a first outer boundary pixel located on a first imaginary line extending from the first inner boundary pixel, wherein a pixel located on the first imaginary line is determined to be the first outer boundary pixel when the difference of the image information between the pixel and its neighboring pixel which are located on the first imaginary line becomes the maximum among differences of the image information between two neighboring pixels located on the first imaginary line;
   finding a second outer boundary pixel located on a second imaginary line extending from the second inner boundary pixel, wherein a pixel located on the second imaginary line is determined to be the second outer boundary pixel when the difference of the image information between the pixel and its neighboring pixel which are located on the second imaginary line becomes the maximum among differences of the image information between two neighboring pixels located on the second imaginary line; and
   using at least one of the first outer boundary pixel and the second outer boundary pixel for further processing.

2. The method of claim 1, wherein the location information of the inner boundary is obtained with use of a Canny edge detection method.

3. The method of claim 1, further comprising:
   obtaining data of a substantial portion, but not all, of the iris image; and
   processing the data of the substantial portion to obtain an iris pattern.

4. The method of claim 3, wherein the data comprises the location information and the image information of a pixel within the portion.

5. The method of claim 3, wherein the substantial portion of the iris image is from about 25% to about 95% of an area of the iris image.

6. The method of claim 3, wherein the substantial portion of the iris image is from about 40% to about 85% of an area of the iris image.

7. The method of claim 3, wherein the substantial portion of the iris image is from about 50% to about 75% of an area of the iris image.

8. The method of claim 3, wherein the substantial portion of the iris image is from about 55% to about 65% of an area of the iris image.

9. The method of claim 3, wherein the substantial portion of the iris image is substantially annular.

10. The method of claim 3, wherein the substantial portion is substantially annular and defined from the inner boundary to an imaginary closed line between the inner and outer boundaries.

11. The method of claim 10, wherein the imaginary closed line is substantially parallel to the inner boundary.

12. The method of claim 11, wherein a tangent at a point on the inner boundary is substantially parallel to a tangent at a point on the imaginary closed line that is on a line perpendicular to the tangent at the point on the inner boundary.

13. The method of claim 3, wherein the substantial portion is substantially annular and defined from an imaginary closed line between the inner and outer boundaries to the outer boundary.

14. The method of claim 13, wherein the imaginary closed line is substantially parallel to the outer boundary.

15. The method of claim 3, wherein the substantial portion is substantially annular and defined between a first imaginary closed line and a second imaginary closed line, wherein the first imaginary closed line is drawn between the inner and outer boundaries, and wherein the second imaginary closed line is drawn between the first imaginary closed line and the outer boundary.

16. The method of claim 15, wherein the first and second imaginary closed lines are substantially parallel to each other.

17. The method of claim 3, wherein the substantial portion of the iris image is not annular.

18. The method of claim 3, wherein the data of the substantial portion is transformed into a polar coordinate form.

19. A device for processing an image of an eye, comprising:
   means for providing data representing an image of an eye comprising an image of an iris of the eye, the iris image being defined between inner and outer boundaries, the eye image comprising a plurality of pixels, the eye image data comprising location information and image information for each pixel of the eye image;
   means for providing location information of the inner boundary of the iris image, wherein a first inner boundary pixel and a second inner boundary pixel are located at different points on the inner boundary;
   means for finding a first outer boundary pixel located on a first imaginary line extending from the first inner boundary pixel, wherein a pixel located on the first imaginary line is determined to be the first outer boundary pixel when the difference of the image information between the pixel and its neighboring pixel which are located on the first imaginary line becomes the maximum among differences of the image information between two neighboring pixels located on the first imaginary line;

means for finding a second outer boundary pixel located on a second imaginary line extending from the second inner boundary pixel, wherein a pixel located on the second imaginary line is determined to be the second outer boundary pixel when the difference of the image information between the pixel and its neighboring pixel which are located on the second imaginary line becomes the maximum among differences of the image information between two neighboring pixels located on the second imaginary line;

means for obtaining data of a substantial portion, but not all, of the iris image; and means for processing the data of the substantial portion to obtain an iris pattern.

20. An eye image processing system, comprising:
a first circuit configured to process the method of claim 1 and configured to identify data of the iris image from the image of the eye; and
a second circuit configured to process the iris image data so as to obtain data of a substantial portion, but not all, of the iris image for further processing.

21. The system of claim 20, wherein the first and second circuits are integrated in a circuit board or a chip.

22. The system of claim 20, further comprising
a third circuit configured to process the data of the substantial portion of the iris image so as to determine whether the data of the iris image matches a pre-registered data.

23. The method of claim 1, further comprising:
obtaining data of the iris image; and
producing at least one modified iris image data with use of the data of the iris image, the modified iris image data representing an iris image that is rotated by an angle about a point on the iris image.

24. The method of claim 23, wherein the point of rotation is located at a substantially central position of the image of the iris.

25. The method of claim 23, further comprising processing the iris image data to determine whether the iris image data matches a pre-registered iris image data.

26. The method of claim 23, further comprising processing the modified iris image data to determine whether the modified iris image data matches a pre-registered iris image data.

27. The method of claim 23, wherein the modified iris image data represents an iris image that is rotated in a clockwise direction.

28. The method of claim 23, wherein the modified iris image data represents an iris image that is rotated in a counter-clockwise direction.

29. The method of claim 23, wherein a plurality of modified iris image data are produced.

30. The method of claim 23, wherein the modified iris image data is processed in accordance with a wavelet transform method.

31. The method of claim 23, wherein the original iris image data is processed in accordance with a wavelet transform method.

32. An eye image processing system, comprising:
means for providing data representing an image of an eye comprising an image of an iris of the eye, the iris image being defined between inner and outer boundaries, the eye image comprising a plurality of pixels, the eye image data comprising location information and image information for each pixel of the eye image;

means for providing location information of the inner boundary of the iris image, wherein a first inner boundary pixel and a second inner boundary pixel are located at different points on the inner boundary;

means for finding a first outer boundary pixel located on a first imaginary line extending from the first inner boundary pixel, wherein a pixel located on the first imaginary line is determined to be the first outer boundary pixel when the difference of the image information between the pixel and its neighboring pixel which are located on the first imaginary line becomes the maximum among differences of the image information between two neighboring pixels located on the first imaginary line;

means for finding a second outer boundary pixel located on a second imaginary line extending from the second inner boundary pixel, wherein a pixel located on the second imaginary line is determined to be the second outer boundary pixel when the difference of the image information between the pixel and its neighboring pixel which are located on the second imaginary line becomes the maximum among differences of the image information between two neighboring pixels located on the second imaginary line;

means for identifying data of the iris image; and means for producing at least one modified iris image data based on the data of the iris image, the modified iris image data representing an iris image that is rotated by an angle about a point on the image.

33. The device of claim 32, further comprising:
means for determining whether the modified iris image data matches a pre-registered data.

34. An eye image processing system, comprising:
a first circuit configured to process the method of claim 1 and configured to identify data of the iris image from the image of the eye; and
a second circuit configured to process the iris image data so as to produce at least one modified iris image data based on the data of the original iris image, the modified iris image data representing an iris image that is rotated by an angle about a point on the original image.

35. The system of claim 34, further comprising:
a third circuit configured to process the modified iris image data to determine whether the modified iris image data matches a pre-registered data.

36. The method of claim 1, wherein a third inner boundary pixel is located at a different point on the inner boundary from the points on the inner boundary where the first inner boundary pixel and the second inner boundary pixel are located, and wherein the method further comprises finding a third outer boundary pixel located on a third imaginary line extending from the third inner boundary pixel, wherein a pixel located on the third imaginary line is determined to be the third outer boundary pixel when the difference of the image information between the pixel and its neighboring pixel which are located on the third imaginary line becomes the maximum among differences of the image information between two neighboring pixels located on the third imaginary line.

37. The method of claim 36, wherein the outer boundary is determined to be a generally circular line on which the first, second and third outer boundary pixels located.

38. The method of claim 36, wherein a fourth inner boundary pixel is located at a different point on the inner boundary from the points on the inner boundary where the first, second and third inner boundary pixels are located, and wherein the method further comprises finding a fourth outer boundary pixel located on a fourth imaginary line extending from the fourth inner boundary pixel, wherein a pixel located on the fourth imaginary line is determined to be the fourth outer boundary pixel when the difference of the image information between the pixel and its neighboring pixel which are located on the fourth imaginary line becomes the maximum among differences of the image information between two neighboring pixels located on the fourth imaginary line, wherein the first imaginary line is substantially perpendicular to the third and fourth imaginary lines, and wherein the second imaginary line is substantially perpendicular to the third and fourth imaginary lines.

\* \* \* \* \*